United States Patent
Bradley

(10) Patent No.: US 11,230,941 B2
(45) Date of Patent: Jan. 25, 2022

(54) GAS TURBINE ENGINE ELECTRICAL GENERATOR

(71) Applicant: ROLLS-ROYCE plc, London (GB)

(72) Inventor: Jonathan P Bradley, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/914,911

(22) Filed: Jun. 29, 2020

(65) Prior Publication Data

US 2021/0010383 A1 Jan. 14, 2021

(30) Foreign Application Priority Data

Jul. 12, 2019 (GB) ...................................... 1910010

(51) Int. Cl.
*F01D 15/10* (2006.01)
*F01D 25/16* (2006.01)

(52) U.S. Cl.
CPC ........... *F01D 15/10* (2013.01); *F01D 25/162* (2013.01); *F01D 25/166* (2013.01)

(58) Field of Classification Search
CPC ...... F01D 15/10; F01D 25/162; F01D 25/164; F01D 25/166; F02C 7/32; F02K 5/00; F05D 2220/76; F05D 2240/50; F05D 2260/96; F16C 2360/23; F16C 27/045; F16C 41/004
See application file for complete search history.

(56) References Cited

U.S. PATENT DOCUMENTS

| 4,531,357 | A | 7/1985 | Weber et al. | |
| 7,061,147 | B2* | 6/2006 | Ries | H02K 55/04 |
| | | | | 310/54 |
| 7,648,278 | B2* | 1/2010 | Stout | F16F 15/0237 |
| | | | | 384/99 |
| 7,692,347 | B2* | 4/2010 | Nakajima | F16F 15/0237 |
| | | | | 310/90 |
| 10,309,454 | B2* | 6/2019 | Takaoka | F16C 19/06 |
| 10,495,144 | B1* | 12/2019 | Ellwood, III | F16C 35/067 |
| 10,710,734 | B2 | 7/2020 | Sankrithi | |

(Continued)

FOREIGN PATENT DOCUMENTS

| DE | 10 2010 049 885 A1 | 5/2012 |
| DE | 102013209388 A1 | 11/2014 |

(Continued)

OTHER PUBLICATIONS

Search Report of the Intellectual Property Office of the United Kingdom for GB1910010.6 with search date of Jan. 9, 2020.

(Continued)

*Primary Examiner* — Jesse S Bogue
(74) *Attorney, Agent, or Firm* — Oliff PLC

(57) ABSTRACT

An aircraft gas turbine engine (10) comprises a main engine spool (22) and a bearing arrangement (36) configured to rotatably support the main engine spool (22). The bearing arrangement (36) includes a damper (41) comprising a static element (42) and a moveable element (39). The gas turbine engine further comprises an electric machine (30) comprising a rotor (34) and a stator (32). The rotor (34) is mounted to the main engine spool (22), and the stator (32) is mounted to the moveable element (39) of the damper to be moveable with the moveable element (39).

10 Claims, 6 Drawing Sheets

(56) References Cited

U.S. PATENT DOCUMENTS

| | | | |
|---|---|---|---|
| 10,724,400 B2* | 7/2020 | Ac | ............................ F16C 19/26 |
| 2004/0040312 A1 | 3/2004 | Hoffjann et al. | |
| 2006/0137355 A1* | 6/2006 | Welch | .................. H02K 7/1823 |
| | | | 60/772 |
| 2006/0138888 A1 | 6/2006 | Bouiller et al. | |
| 2008/0001038 A1 | 1/2008 | Daggett | |
| 2008/0110151 A1 | 5/2008 | Welch et al. | |
| 2008/0148881 A1 | 6/2008 | Moniz et al. | |
| 2008/0166076 A1 | 7/2008 | Stout et al. | |
| 2010/0000226 A1 | 1/2010 | Rensch | |
| 2010/0327588 A1 | 12/2010 | Macchia | |
| 2011/0154827 A1 | 6/2011 | Ress, Jr. et al. | |
| 2013/0098179 A1 | 4/2013 | Beier et al. | |
| 2014/0026700 A1 | 1/2014 | Beier | |
| 2014/0306460 A1 | 10/2014 | Donnelly | |
| 2015/0308383 A1 | 10/2015 | Hoffjann et al. | |
| 2015/0311770 A1 | 10/2015 | Goi et al. | |
| 2016/0160867 A1* | 6/2016 | Gehlot | .................... F04D 25/06 |
| | | | 60/805 |
| 2017/0141648 A1 | 5/2017 | Chong et al. | |
| 2018/0051701 A1* | 2/2018 | Kupiszewski | ......... H02K 7/083 |
| 2018/0138767 A1 | 5/2018 | Moore et al. | |
| 2018/0372004 A1 | 12/2018 | Alstad et al. | |
| 2019/0048826 A1 | 2/2019 | Pointon et al. | |
| 2019/0101057 A1 | 4/2019 | Stevenson et al. | |
| 2019/0178104 A1* | 6/2019 | Joshi | ..................... F01D 25/164 |
| 2019/0218978 A1 | 7/2019 | Edwards et al. | |
| 2019/0316486 A1 | 10/2019 | Roberge | |

FOREIGN PATENT DOCUMENTS

| | | | |
|---|---|---|---|
| EP | 1939429 | A2 | 7/2008 |
| EP | 3511549 | A1 | 7/2019 |
| GB | 2 443 743 | A | 5/2008 |
| GB | 2 550 397 | A | 11/2017 |
| RU | 2168024 | 02 | 5/2001 |

OTHER PUBLICATIONS

Search Report of the Intellectual Property Office of the United Kingdom for GB1910011.4 with search date of Dec. 17, 2019.
Search Report of the Intellectual Property Office of the United Kingdom for GB1910008.0 with search date of Jan. 9, 2020.
Search Report of the Intellectual Property Office of the United Kingdom for GB1910009.8 with search date of Jan. 9, 2020.
Aug. 9, 2021 Office Action Issued in U.S. Appl. No. 16/915,032.
Aug. 18, 2021 Office Action Issued In U.S. Appl. No. 16/914,827.
Sep. 17, 2021, Final Office Action Issued in U.S. Appl. No. 16/915,032.
U.S. Appl. No. 16/914,867, filed Jun. 29, 2020 in the name of Paul R. Davies.
U.S. Appl. No. 16/914,827, filed Jun. 29, 2020 in the name of Paul R. Davies.
U.S. Appl. No. 16/915,032, filed Jun. 29, 2020 in the name of Jonathan P. Bradley.
Dec. 8, 2020 Extended Search Report issued in European Patent Application No. 20180138.8.
Dec. 8, 2020 Extended Search Report issued in European Patent Application No. 20180140.4.
Dec. 8, 2020 Extended Search Report issued in European Patent Application No. 20180139.6.
Dec. 8, 2020 Extended Search Report issued in European Patent Application No. 20180137.0.
Nov. 8, 2021 Notice of Allowance issued in U.S. Appl. No. 16/915,032.
Nov. 12, 2021 Notice of Allowance issued in U.S. Appl. No. 16/914,827.

* cited by examiner

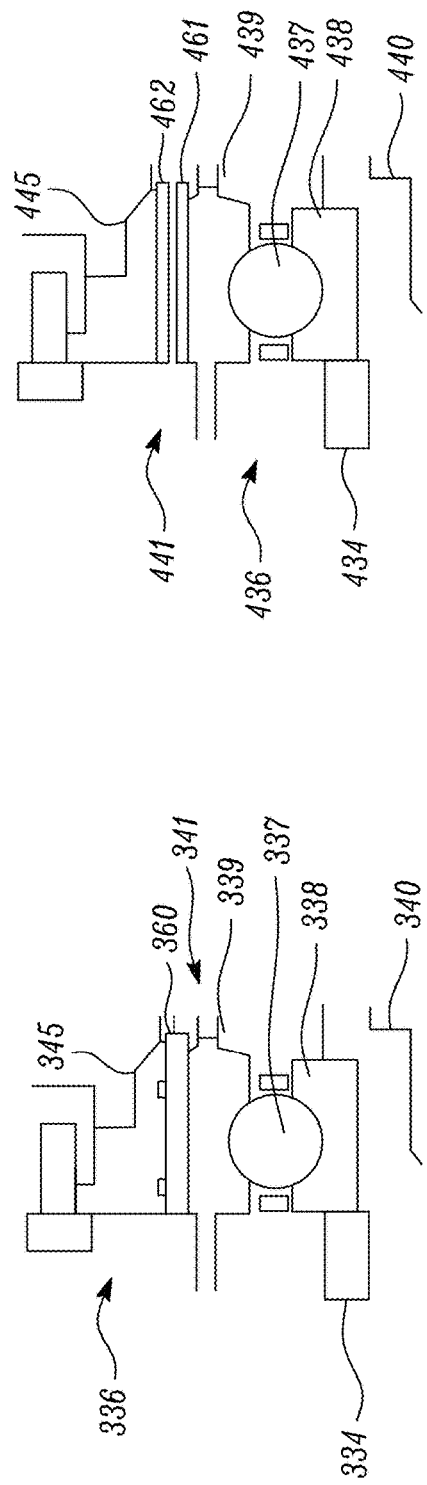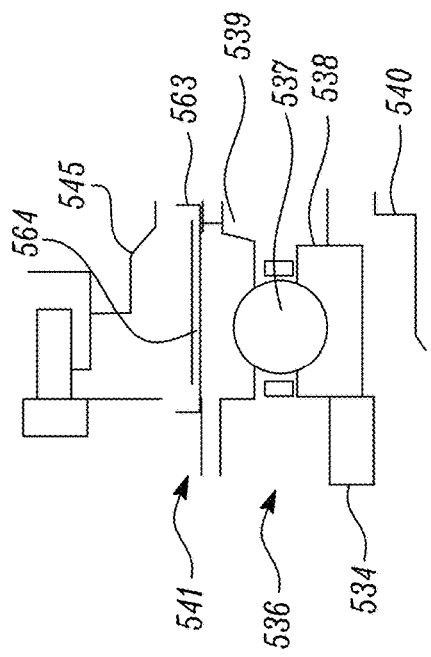

GAS TURBINE ENGINE ELECTRICAL GENERATOR

CROSS-REFERENCE TO RELATED APPLICATIONS

This application claims the benefit of United Kingdom Patent Application No. 1910010.6 filed Jul. 12, 2019, the disclosure of which is herein incorporated by reference in its entirety.

TECHNICAL FIELD

The present disclosure relates to electric machines of gas turbine engines, and gas turbines comprising electrical machines.

BACKGROUND

Aircraft gas turbine engines provide both propulsive and electric power for aircraft. Consequently, such engines comprise electric machines such as generators for providing electric power. Further electric machines in the form of motors configured to drive fluid pumps such as oil and fuel pumps may also be provided.

As electrical power demands increase, and electrical motors are increasingly used to replace hydraulic and pneumatic motors in aircraft, the size of electric machines on aircraft is steadily increasing relative to the size of the gas turbine engines. Consequently, packaging of such machines within the limited space available is becoming increasingly difficult.

A conventional packaging arrangement for an electric machine for a gas turbine engine is shown in FIG. 1. A gas turbine engine 1 comprises a main engine compressor shaft 2, which rotates when the engine is in operation. This is coupled to an offtake shaft 3 via bevel gears 4. The offtake shaft 3 is in turn coupled to an angle drive shaft 5 through a second set of bevel gears 6. An electric machine 7 is coupled to the angle drive shaft 5. Such an arrangement is heavy, complex, and inefficient, in view of the gearing.

Alternative arrangements have also been proposed, including so-called "embedded generators", in which an electric machine is installed within an annular space radially inward of a compressor. Such an arrangement provides for efficient packaging, but presents other difficulties.

The present invention seeks to provide an improved gas turbine engine electric machine.

SUMMARY

According to a first aspect there is provided an aircraft gas turbine engine comprising: a main engine spool; a bearing arrangement configured to rotatably support the main engine spool, the bearing arrangement comprising a damper comprising a static element and a moveable element; and an electric machine comprising a rotor and a stator; wherein the rotor is mounted to the main engine spool, and the stator is mounted to the moveable element of the damper to be moveable with the moveable element.

The inventors have found that, in gas turbine engine electric machines such as generators, in which the machine rotor is mounted to the main engine shaft, by mounting the stator of the electric machine to the moveable element of the damper which mounts the shaft, relative movement of the main engine shaft (and so the rotor of the electric machine) results in matched movement of the stator of the electric machine. Consequently, a small, consistent running clearance can be maintained between the rotor and stator of the electric machine, thereby reducing the risk of contact between the rotor and stator, and increasing the efficiency of the electric machine.

The damper may comprise one of a squeeze film damper, an elastomeric material, an electromagnetic damper, and a piston damper.

The stator may be cantilevered from the damper.

Alternatively, the gas turbine engine may comprise first and second bearing arrangements, each bearing arrangement comprising a respective damper comprising a static element and a moveable element, and the stator may be mounted to each moveable element.

The bearing arrangement may comprise a roller bearing, and may comprise a ball bearing.

The electric machine may comprise an electric motor configured to provide motive power to start the gas turbine engine in a starting mode, and may comprise a generator configured to generate electrical power when in a running mode.

The electric machine may comprise a radial flux electric machine. The stator may be radially outward of the rotor.

The electric machine may comprise a permanent magnet electric machine.

The gas turbine engine spool may comprise a shaft arranged to couple a turbine to a compressor. The spool may further comprise one or more compressor or turbine drive arms, and may comprise one or more compressor or turbine discs. The drive arms may be configured to couple one or more discs to the shaft. The electric machine rotor may be coupled to one of a drive arm and a disc, and may be coupled via an electric machine rotor shaft.

The bearing may be configured to support the gas turbine engine spool via the electric machine rotor. The bearing arrangement may comprise a static mounting extending between an engine casing and the electric machine rotor.

The gas turbine engine may comprise a high pressure spool comprising a high pressure compressor coupled to a high pressure turbine by a high pressure shaft.

The gas turbine engine may comprise a low pressure spool comprising a low pressure compressor coupled to a low pressure turbine by a low pressure shaft.

The electric machine rotor may be coupled to one of the high pressure spool and the low pressure spool.

The low and high pressure shafts may be coaxial, and the low pressure shaft may be provided radially inward of the high pressure shaft along at least part of its length.

The gas turbine engine may comprise a fan coupled to a main engine spool.

The electric machine may comprise a permanent magnet electric machine. Permanent magnet machines have a high power density, and so enable still further reductions in weight, and increased packaging efficiency.

The low pressure compressor may be located axially forwardly of the high pressure compressor.

The electric machine stator may be located forward of the low pressure compressor.

Arrangements of the present disclosure may be particularly, although not exclusively, beneficial for fans that are driven via a gearbox. Accordingly, the gas turbine engine may comprise a gearbox that receives an input from one or more main engine shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The electric machine may be located axially between the gearbox and the low pressure compressor. Alternatively, the electric machine rotor may be mounted to one of the rotating components of the gearbox.

The gas turbine engine as described and/or claimed herein may have any suitable general architecture. For example, the gas turbine engine may have any desired number of shafts that connect turbines and compressors, for example one, two or three shafts.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 6a to 6c show alternative damping arrangements for the gas turbine engines of FIG. 2 or FIG. 4.

DETAILED DESCRIPTION

Figure 2:
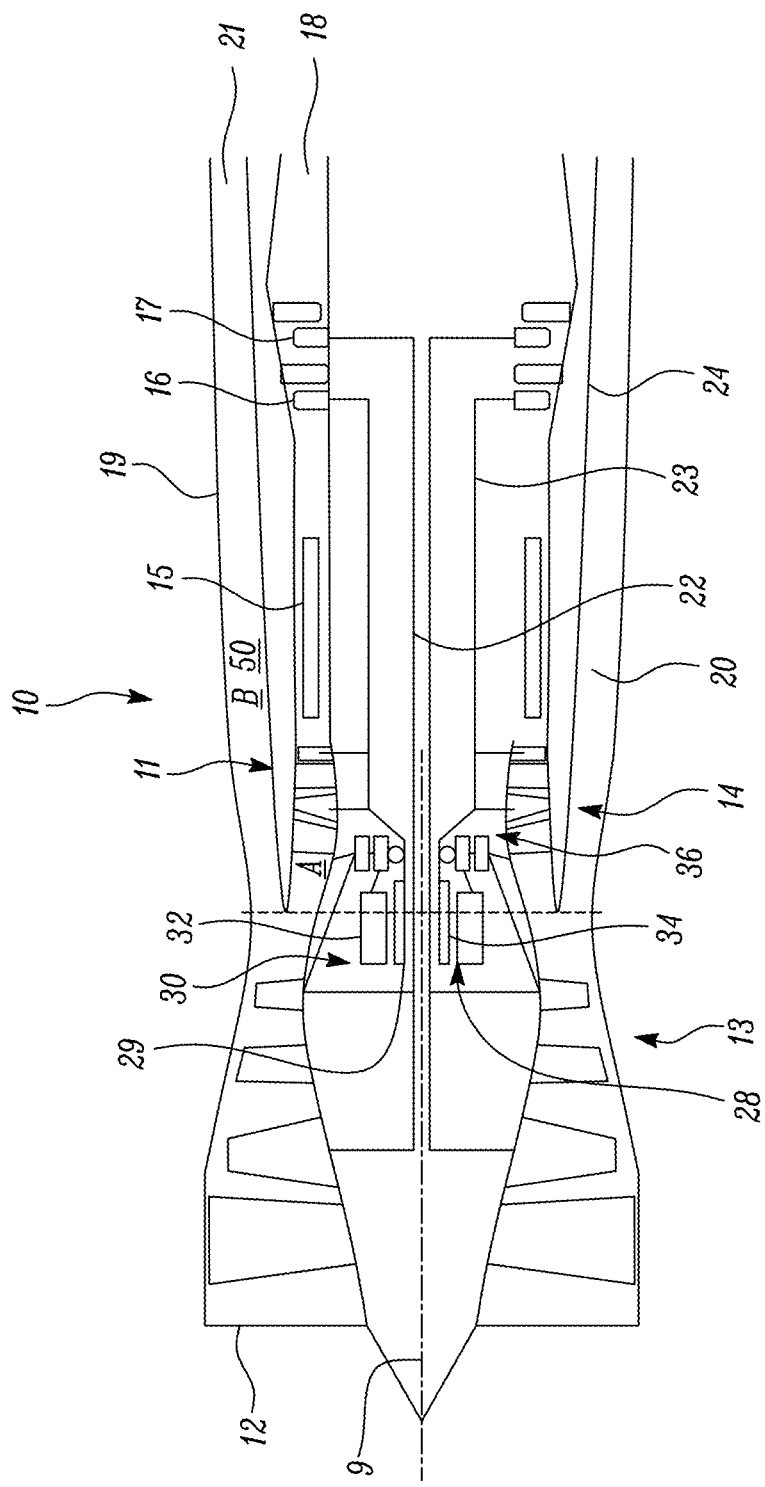
FIG. 2 is a sectional side view of a first gas turbine engine in accordance with the present disclosure.

FIG. 2 illustrates a gas turbine engine in the form of a low bypass turbofan 10 having a principal rotational axis 9. The engine 10 comprises an air intake 12 and a propulsive fan/low pressure compressor 13 that generates two airflows: a core airflow A and a bypass airflow B. The gas turbine engine 10 comprises a core 11 that receives the core airflow A. The engine core 11 comprises, in axial flow series, a high pressure compressor 14, combustion equipment 15, a high-pressure turbine 16, a low pressure turbine 17 and a core exhaust nozzle 18. A nacelle 19 surrounds the gas turbine engine 10 and defines a bypass duct 20 and a bypass exhaust nozzle 21. The bypass airflow B flows through the bypass duct 50, which is bounded by a radially inner wall in the form of a core nacelle 24. The fan 13 is attached to and driven by the low pressure turbine 17 via a low pressure shaft 22. The high pressure compressor 14 is coupled to the high pressure turbine 16 by a high pressure shaft 23.

In use, the core airflow A is accelerated and compressed by the high pressure compressor 14 and directed into the combustion equipment 15 where it is mixed with fuel and the mixture is combusted. The resultant hot combustion products then expand through, and thereby drive, the high pressure and low pressure turbines 16, 17 before being exhausted through the nozzle 18 to provide some propulsive thrust. The high pressure turbine 16 drives the high pressure compressor 14 by a high pressure shaft 13. The fan 13 is in the form of a high pressure, low bypass ratio, multi-stage fan, and provides approximately half the thrust. In view of the high pressure ratio of the fan 13, the fan 13 can be regarded as a further, low pressure compressor.

The engine can be divided into one or more "spools". Each spool comprises a plurality of rotating components, which rotate together in unison, at the same speed. For instance, in the present disclosure, two spools are provided—a high pressure spool and a low pressure spool. The high pressure spool comprises at least the high pressure compressor 14, high pressure turbine 16, and interconnecting high pressure shaft 23, along with other components that rotate with these components about the main engine axis 9. Similarly, the low pressure spool comprises at least the low pressure compressor/fan 13, low pressure turbine 17, and interconnecting low pressure shaft 22, along with other components that rotate with these components about the main engine axis 9.

The gas turbine engine comprises an electric machine arrangement, which is configured to produce electrical power, and/or provide motive power to start the engine. The electric machine arrangement comprises a starter generator 30, which comprises an electric machine stator 32 and an electric machine rotor 34. The electric machine rotor 34 is coupled to the high pressure spool in this example. The arrangement further comprises a generator bearing arrangement 36, which mounts components of the low pressure spool. The electric machine arrangement, including the bearing 36, is shown in further detail in FIG. 3.

Figure 3:
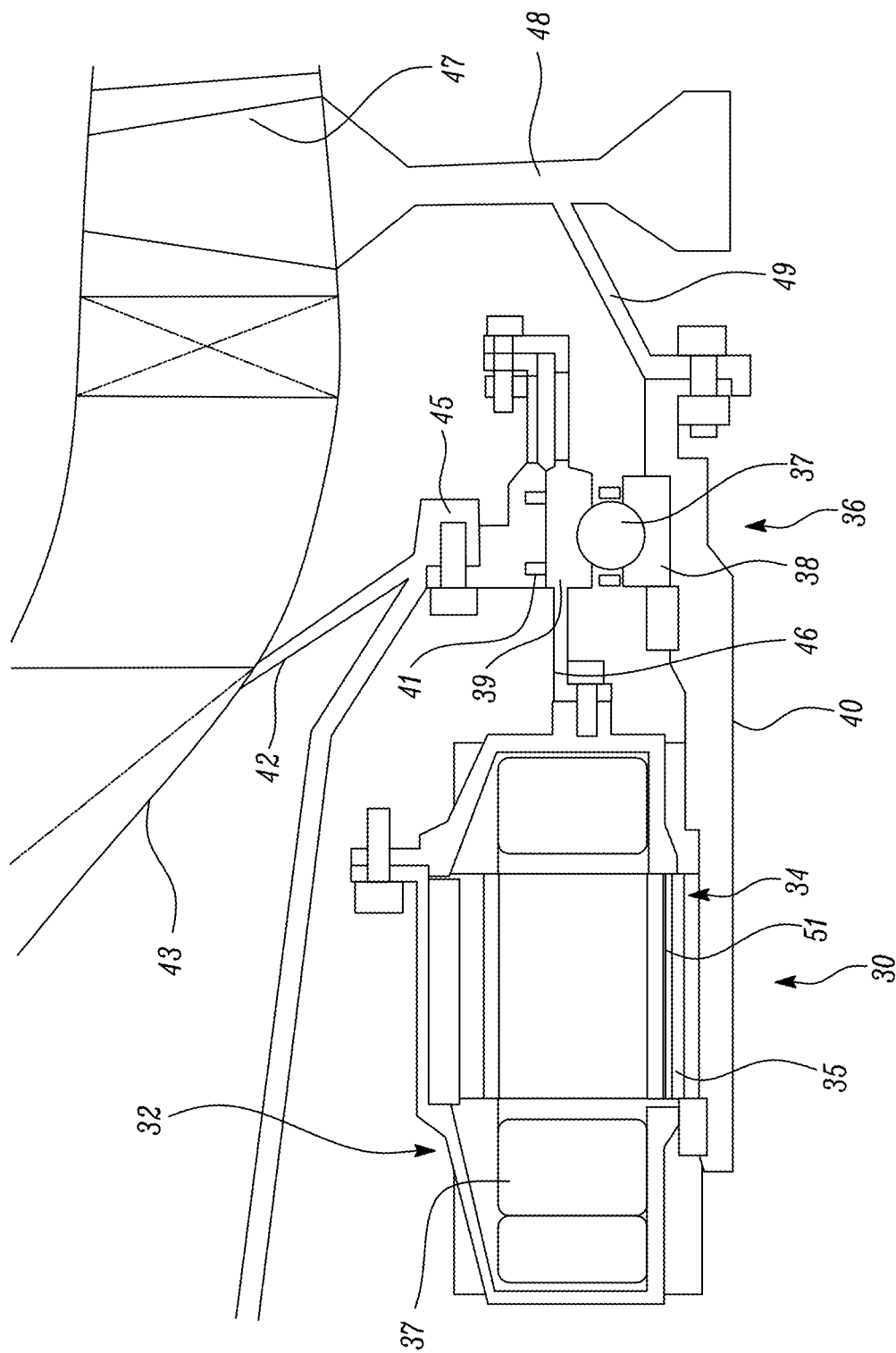
FIG. 3 is s sectional side view of part of the gas turbine engine of FIG. 2.

Referring now to FIG. 3, the electric machine arrangement is shown in more detail. The machine 30 is in the form of a permanent magnet, radial flux electric machine. The rotor 34 comprises a plurality of permanent magnets 35, which are attached to a radially outer surface of the rotor 34. The rotor 34 is mounted to an electric machine rotor shaft 40, which is configured to rotate with the rotor 34 in use. The permanent magnets face the stator 32 across an airgap 51. Each stator 32 comprises a plurality of electric windings 37 which can be energised with electrical current to enable the machine to act as a motor, or will be energised by interaction with the rotating magnetic field of the rotor 34 to act as a generator.

The bearing arrangement 36 is also shown in further detail in FIG. 3. The bearing arrangement comprises a rolling element 37 in the form of a ball bearing, which is held by radially inner and outer races 38, 39. The radially inner race 38 is coupled to the electric machine rotor drive shaft 40, such that the bearing arrangement 36 provides rotational support for the electric machine rotor 34. The radially outer race 39 is configured to be static in use, and is mounted to a static structure such as a compressor inner annulus casing 43 via a strut 42 and a damper 41.

The bearing arrangement 36 also provides rotational support for at least one end of the high pressure compressor 14. In particular, the high pressure compressor 14 comprises a plurality of compressor blades 47. The compressor blades are mounted to one or more compressor discs 48. In some cases, the blades 47 and disks 48 may comprise a unitary component, known as a "blisk". At least one compressor disc 48 is in turn coupled to the machine drive arm 40 via a compressor drive arm 49. Consequently, both the compressor 14 and the electric machine rotor 34 are rotationally mounted and grounded to static structure via the damper 41.

The damper 41 is in this embodiment a squeeze film damper, but can in principle be any kind of damper. As will be understood, a damper is a mechanical device which dissipates energy from movement, to reduce vibration and react shock loads. In particular, in a gas turbine engine, dampers are required to suppress rotordynamic instability and reduce rotor response to vibration/imbalance. Typically, dampers may be required to protect the rotational elements of the spool (bearings, compressors, turbines etc) from shock and vibrational loads in flight, such that damage and excessive wear to these components is avoided. Consequently, the damper 41 allows for at least some radial movement in use between the electric machine drive shaft 40 and the static structure 42, and may also provide for some axial and pivoting movement as well.

The squeeze film damper comprises an oil supply (not shown), which provides high pressure oil to an annular gallery between outer race 39 and damper 41.

In use, dynamic loads acting on the spool cause relative radial movements to occur at this interface, leading to displacement of the oil within the annular gallery. Due to the viscosity of the oil, such movements lead to a resistive hydraulic reaction load to be exerted between outer race 39 and damper 41.

Consequently, the bearing 36 can move radially in use relative to static structure 42, while being damped. Consequently, any equipment mounted to the moveable element will also be able to move with the bearing in use.

The stator 32 of the electric machine is statically mounted to the outer race 39 via a mounting arm 46, which extends axially forward of the outer race 39. The stator 32 is mounted at one axial end, and so is cantilevered from the outer race 39. Consequently, the stator 32 is mounted via a movable element of a damping system, and so moves in conjunction with the moveable element of the damping system, and also any parts mounted via the moveable element of the damping system. Since the rolling bearing 37 and bearing inner race 38 are mounted via the outer race, these comprise moveable elements.

As noted previously, the machine rotor 34 and compressor 14 are mounted via the moveable element 39 of the damper 41, in addition to the machine stator 32 being mounted via the moveable element of the damper 41. Consequently, each of the compressor 14, machine rotor 34 and stator 32 move together in unison when the damper moveable element moves radially or axially. As a result of at least both the rotor 34 and the stator 32 being mounted via the moveable element 39, a consistent air gap 51 is maintained in use, since movement of the moveable element of the damper 41 does not cause relative movement between the stator 32 and the rotor 34. Consequently, a consistent, small airgap 51 can be provided. The lack of movement between the stator 32 and rotor 34 in use ensures that there will be no (or very rare) contact between these components, which might result in wear or damage. As a result of the reduced risk of rotor-stator contact, the air gap 51 can be minimised, which enables higher power density (particularly in the case of permanent magnet machines) and efficiency (particularly in the case of inductance machines).

Figure 4:
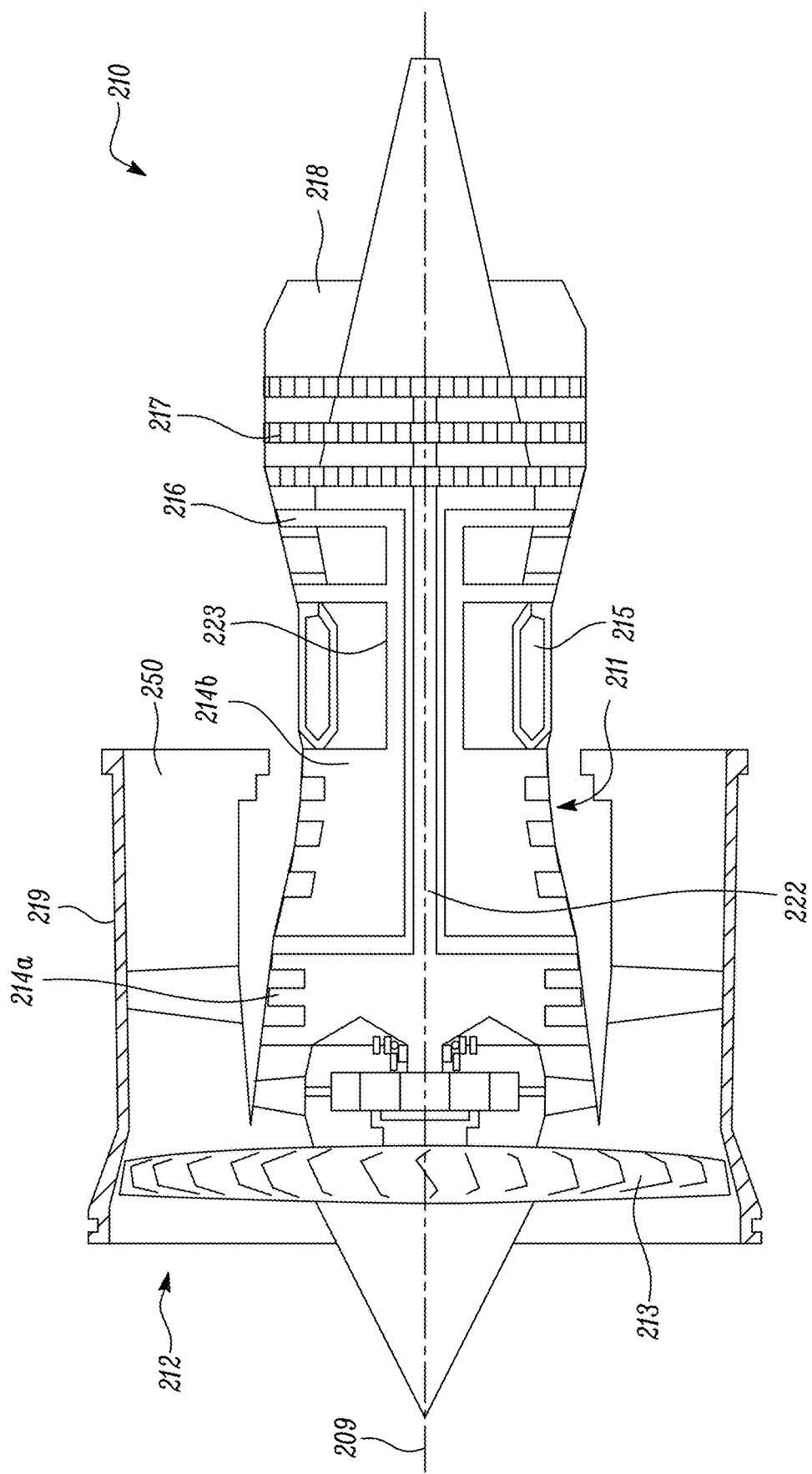
FIG. 4 is a sectional side view of a second gas turbine engine in accordance with the present disclosure.

FIG. 4 shows an alternative gas turbine engine 210 in the form of a geared, high bypass ratio gas turbine engine 210. The engine 210 comprises an air intake 212 and a propulsive fan 213 that generates two airflows: a core airflow A and a bypass airflow B. The fan 213 differs from the fan 13, in that only a single, low pressure stage is provided. However the fan 213 has a much larger diameter compared to the core fan 211, and so defines a high bypass ratio. The gas turbine engine 210 comprises a core 211 that receives the core airflow A. The engine core 211 comprises, in axial flow series, a low pressure compressor 214a, a high pressure compressor 214b, combustion equipment 215, a high-pressure turbine 216, a low pressure turbine 217 and a core exhaust nozzle 218. A nacelle 219 surrounds the gas turbine engine 210 and defines a bypass duct 250. The bypass airflow B flows through the bypass duct 250, which is bounded by a radially inner wall in the form of a core nacelle 224. The fan 213 is attached to and driven by the low pressure turbine 217 via a low pressure shaft 222 and reduction gearbox 240. The low pressure turbine also drives the low pressure compressor 214a. The high pressure compressor 214b is coupled to the high pressure turbine 216 by a high pressure shaft 223. The shafts 222, 223 rotate about a longitudinal axis 219. Together, the high pressure turbine, shaft and compressor 216, 214b, 223 form a high pressure spool, and the low pressure turbine 217, shaft 222, compressor 214a, gearbox 240 and fan 213 together form a low pressure spool.

Figure 5:
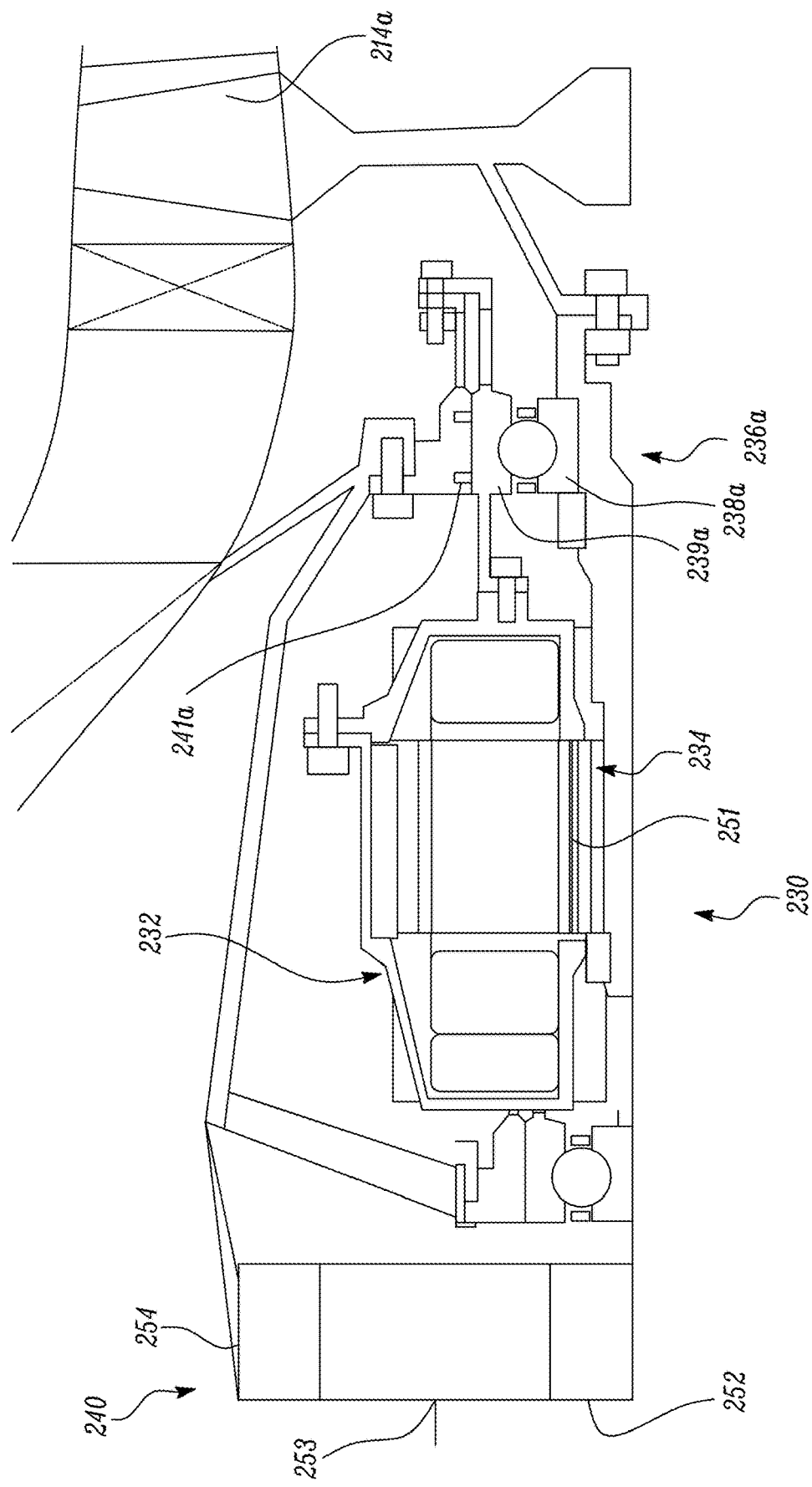
FIG. 5 is a sectional side view of part of the gas turbine engine of FIG. 3.

Referring now to FIG. 4 in conjunction with FIG. 5, the low pressure turbine 217 drives the low pressure shaft 222, which is coupled to a sun gear 252 of the gearbox 240. The sun gear meshes with a plurality of planet gears 253, which in turn mesh with a ring gear 254. The planet gears are mounted to a planet carrier, which is in turn mounted to the fan 213 to thereby turn the fan at a reduced speed compared to the low pressure turbine 217.

The gas turbine engine 210 additionally comprises an electric machine arrangement, which is configured to produce electrical power, and/or provide motive power to start the engine. The electric machine arrangement is similar to the arrangement of the first embodiment, and again comprises starter generator 230, which comprises an electric machine stator 232 and an electric machine rotor 234. The electric machine differs from the previous embodiment, in that the electric machine rotor 234 is coupled to the low pressure spool in this example. The electric machine arrangement also differs from the first embodiment, in that the stator 232 and rotor 234 are provided in a space within the core 211 axially between the low pressure compressor 214a and the gearbox 240.

The arrangement further comprises a generator bearing arrangement 236, which mounts components of the low pressure spool. Again, the stator 232, rotor 234 and low pressure compressor 214a are each mounted to a moveable element (e.g. an outer bearing race 239) of a damper 241, which again forms part of the bearing arrangement 236. Again therefore, radial movement of the moveable element of the bearing arrangement allows for coordinated radial movement of both the stator 232 and rotor 234, allowing for a constant airgap 251 therebetween.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 4 has a split flow nozzle meaning that the flow through the bypass duct has its own nozzle that is separate to and radially outside the core engine nozzle 218. However, this is not limiting, and any aspect of the present disclosure may also apply to engines in which the flow through the bypass duct and the flow through the core are mixed, or combined, before (or upstream of) a single nozzle, which may be referred to as a mixed flow nozzle. One or both nozzles (whether mixed or split flow) may have a fixed or variable area.

Similarly, different types of dampers could be provided. Each of FIGS. 6a, 6b and 6c show alternative bearings arrangements suitable for use with the engines 10, 210, having different damper arrangements.

FIG. 6a shows a bearing arrangement 336, comprises a bearing inner race 338, bearing outer race 339, with a ball bearing 337 therebetween, to allow for relatively rolling movement. A rotor 334 of an electric machine is mounted to a shaft 340, to rotate with the bearing inner race 338. A damper 341 is also provided, which provides for relative axial movement between a static component 345, and a moveable component 341 to which the bearing outer race 339 is mounted.

The damper 341 is in the form of an elastomeric damper which comprises an elastomeric material 360, which mounts the moveable component 339 to the static component 345. The elastomeric material is able to flex in use and, as it does so, dissipate energy to act as a damper.

FIG. 6b shows a bearing arrangement 436, comprises a bearing inner race 438, bearing outer race 439, with a ball bearing 437 therebetween, to allow for relatively rolling movement. A rotor 434 of an electric machine is mounted to a shaft 440, to rotate with the bearing inner race 438. A damper 441 is also provided, which provides for relative axial movement between a static component 445, and a moveable component 441 to which the bearing outer race 439 is mounted.

The damper 441 is in the form of an electromagnetic damper 441. The electromagnetic damper 441 comprises a permanent magnet 461 mounted to the bearing outer race 439, and an electromagnet 462 mounted to the static component 462. In use, a controller (not shown) actuates the electromagnet 462 to oppose relative movement between the electromagnet 462 and the permanent magnet 461, to thereby damp relative movements, and act as a damper.

FIG. 6c shows a bearing arrangement 536, comprises a bearing inner race 538, bearing outer race 539, with a ball bearing 537 therebetween, to allow for relatively rolling movement. A rotor 534 of an electric machine is mounted to a shaft 540, to rotate with the bearing inner race 538. A damper 541 is also provided, which provides for relative axial movement between a static component 545, and a moveable component 541 to which the bearing outer race 539 is mounted.

The damper 541 is in the form of piston damper 541 (also known as a dashpot). The dashpot 541 comprises a cylinder 563 mounted to the bearing outer race 539, and a piston 564 mounted to the static component 462. In use, the cylinder is filled with a viscous fluid such as oil. Radial movement between the static component 545 and bearing outer race 539 causes movement of the piston 564 relative to the cylinder 563, which causes oil to be pushed around the piston. The friction caused by this movement dissipates energy, and so damps movement.

Whilst the described example relates to a turbofan engine, the disclosure may apply, for example, to any type of gas turbine engine, such as an open rotor (in which the fan stage is not surrounded by a nacelle) or turboprop engine, for example.

Figure 1:
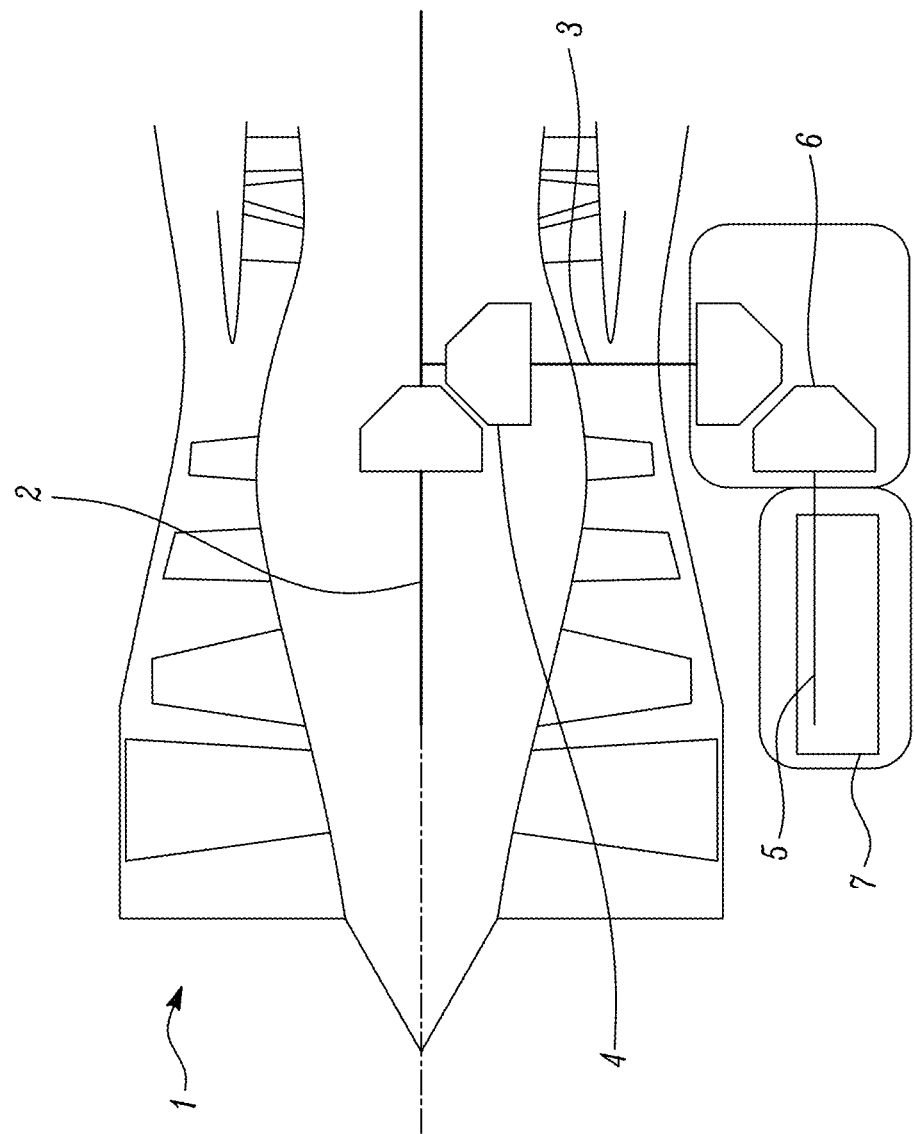
FIG. 1 is a sectional side view of a prior gas turbine engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Different types of electric machines could be used. For example, hybrid axial/radial flux machines could be used. The stator could be provided radially inward of the rotor. The permanent magnet machine could be replaced with any of a wound field machine, an induction machine, and a switched reluctance machine. The machines could be coupled to the high pressure shaft, or could be coupled to the low pressure shaft after the gearbox (i.e. at the output side of the gearbox, where the speed is reduced). The machines could be physically located within the bypass nacelle, or radially inward of the bypass and/or core gas flow paths.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aircraft gas turbine engine comprising:
   a main engine spool;
      an electric machine comprising:
      a rotor mounted to the main engine spool; and
      a stator; and
   a bearing arrangement configured to rotatably support the main engine spool via the rotor, the bearing arrangement comprising a damper comprising:
      a static element; and
      a moveable element mounted to the stator such that the stator is moveable with the moveable element.

2. The gas turbine engine according to claim 1, wherein the damper comprises one of a squeeze film damper, an elastomeric material, an electromagnetic damper, and a piston damper.

3. The gas turbine engine according to claim 1, wherein the stator is cantilevered from the damper.

4. The gas turbine engine according to claim 1, further comprising:
   first and second bearing arrangements, each bearing arrangement comprising a respective damper comprising a static element and a moveable element,
   wherein the stator is mounted to each moveable element.

5. The gas turbine engine according to claim 1, wherein the bearing arrangement comprises a roller bearing.

6. The gas turbine engine according to claim 1, wherein the electric machine comprises one or both of an electric motor configured to provide motive power to start the gas turbine engine in a starting mode, and a generator configured to generate electrical power when in a running mode.

7. The gas turbine engine according to claim 1, wherein the electric machine comprises a radial flux electric machine.

8. The gas turbine engine according to claim 1, wherein the electric machine comprises a permanent magnet electric machine.

9. The gas turbine engine according to claim 1, wherein the main engine spool comprises:
   a shaft arranged to couple a turbine to a compressor;
   one or more compressor or turbine drive arms; and
   one or more compressor or turbine discs, wherein the drive arms are configured to couple one or more discs to the shaft, and the electric machine rotor is coupled to one of a drive arm and a disc.

10. The gas turbine engine according to claim 1, further comprising:
   a high pressure spool comprising a high pressure compressor coupled to a high pressure turbine by a high pressure shaft; and
   a low pressure spool comprising a low pressure compressor coupled to a low pressure turbine by a low pressure shaft,
   wherein the electric machine rotor is coupled to one of the high pressure spool and the low pressure spool.

* * * * *